Patented May 4, 1926.

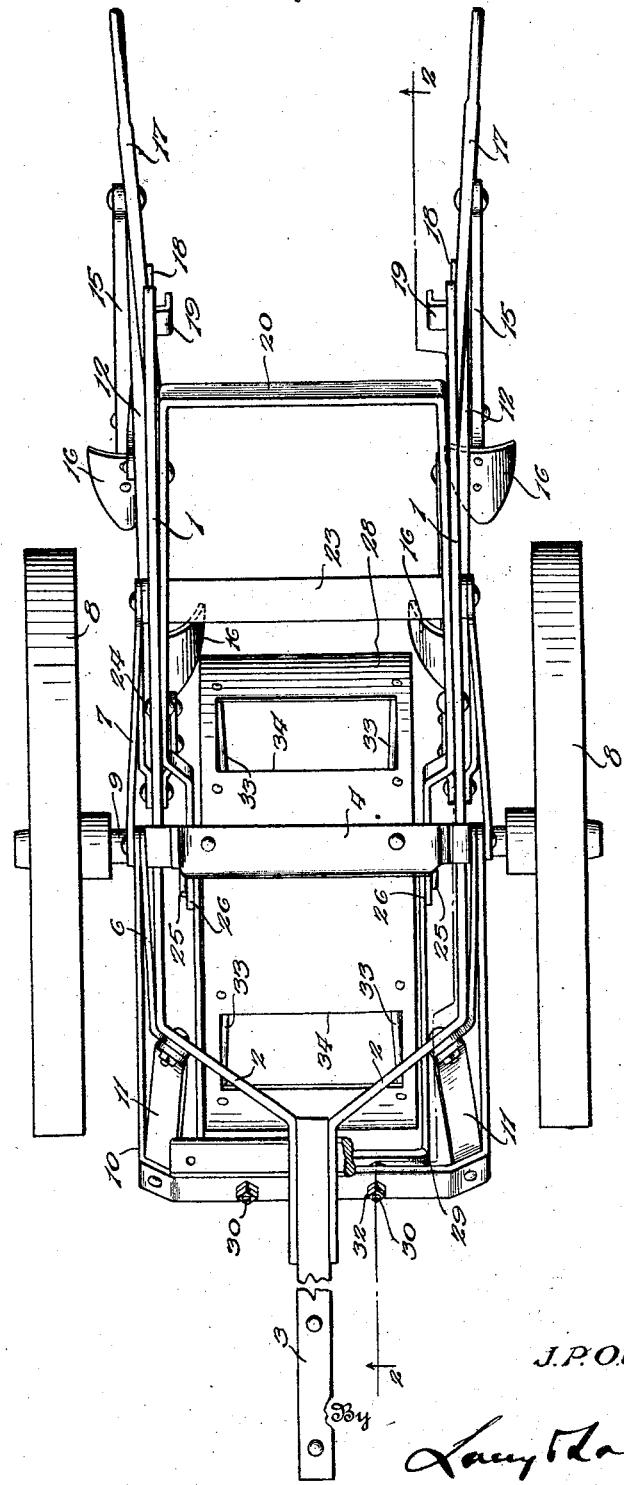

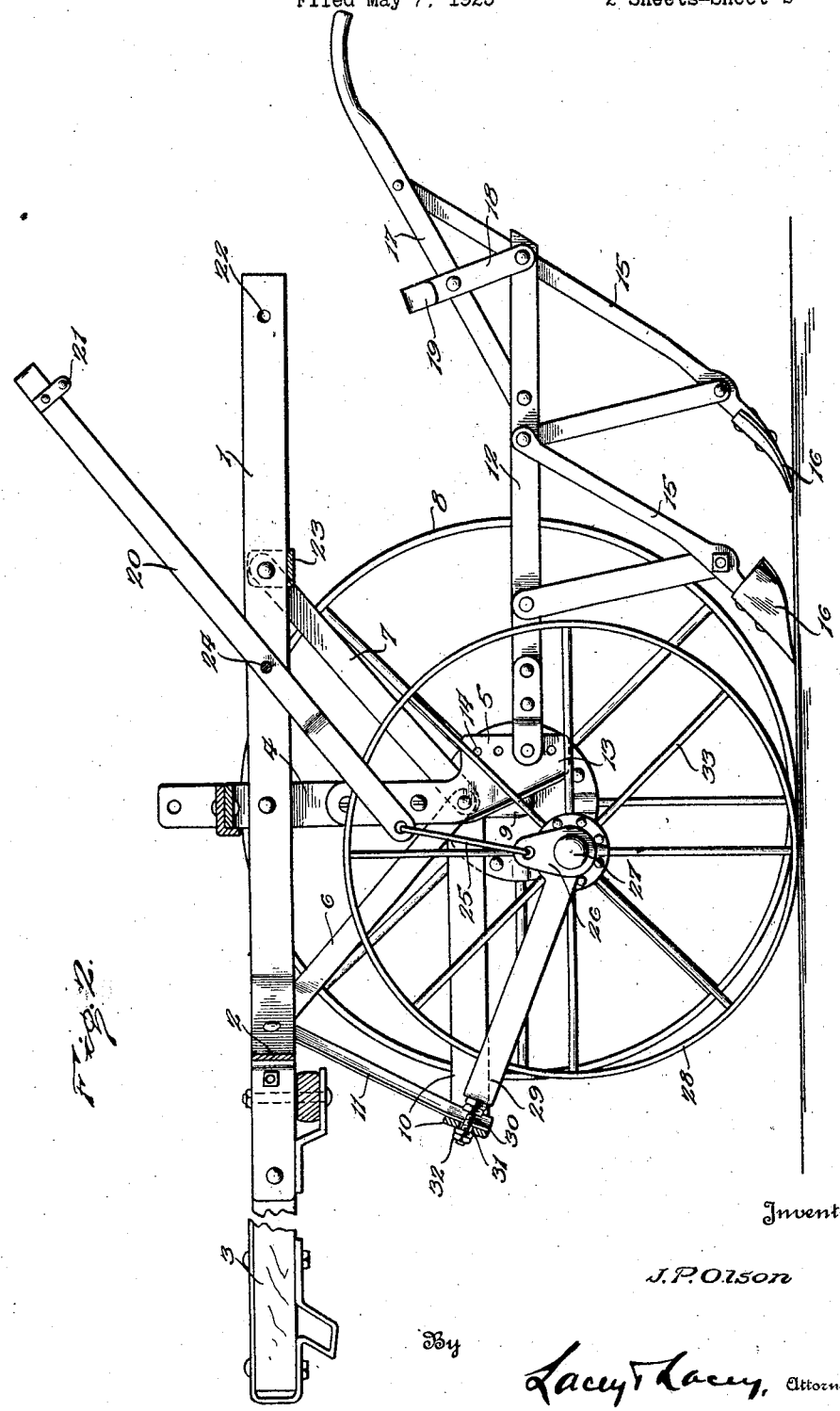

1,583,737

UNITED STATES PATENT OFFICE.

JAMES P. OLSON, OF MOBILE, ALABAMA.

COTTON CRUSHER AND CULTIVATOR.

Application filed May 7, 1925. Serial No. 28,634.

*To all whom it may concern:*

Be it known that I, JAMES P. OLSON, a citizen of the United States, residing at Mobile, in the county of Mobile and State of Alabama, have invented certain new and useful Improvements in Cotton Crushers and Cultivators, of which the following is a specification.

This invention is a machine by which the plants in a row of cotton plants may be reduced in number without the use of knives and complicated mechanism for operating the knives and which will at the same time cultivate the plants. The invention seeks to provide a machine for the stated purpose which will be simple in construction and easily manipulated and which may be readily adjusted so as to reduce the number of plants or be employed merely as a cultivator. The invention is illustrated in the accompanying drawings and will be hereinafter fully set forth.

In the drawings:

Figure 1 is a plan view of a machine embodying my improvements, and

Fig. 2 is a longitudinal vertical section on the line 2—2 of Fig. 1.

In carrying out the invention, I employ a main frame which consists of upper parallel side bars 1 having their front ends bent inwardly, as shown at 2, and secured to the rear end of a draft pole or tongue 3, an arch 4 secured to the said side bars and extending over the same and provided at its ends with brackets 5, and braces 6 and 7 connecting the side bars 1 with the sides of the arch, as shown most clearly in Fig. 2. Ground wheels 8 are mounted upon spindles 9 carried by the arch 4 so that the machine will travel readily over the ground in an obvious manner. Secured to and extending forwardly from the sides of the arch 4 is a bail or lower frame 10 which has its front end disposed below the tongue 3 and arranged transversely of the main frame, braces or hangers 11 being extended between the said frame or bail 10 and the inwardly converging portions 2 of the side bars 1, as shown.

The brackets 5 constitute clevises or hangers to which cultivator beams 12 may be attached and the said brackets are provided with rearwardly projecting extensions 13 having vertical series of openings 14 therethrough, in any one of which the attaching bolt for the cultivator beam may be fitted, thereby adjusting the cultivators vertically so that they may run at any desired depth. The cultivator beams may be of any approved form and are illustrated as having standards 15 attached to and depending therefrom and carrying cultivator shovels 16 which are adapted to turn the surface soil over onto and around the young plants which are left standing so as to permit the growth of the same. To each cultivator beam is secured a handle 17 whereby it may be guided and held to the ground in the usual manner, and to said handle and the beam is secured a strap 18 having its upper end turned inwardly, as at 19, to form a suspending hook adapted to engage over the rear end of the respective side bar 1 whereby to support the cultivator in an inoperative position.

Pivoted to and disposed between the side bars 1 in rear of the arch 4 is a bail or handle member 20 which is provided adjacent its rear end with resilient clips 21 adapted to engage sockets 22 provided therefor in the side bars 1 so that, when so desired, the said handle member may be held in a substantially horizontal position between the said side bars. To brace the structure and also form a support for this handle member 20 in its horizontal position, a cross bar 23 is secured to and extends between the side bars 1 in rear of the pivot 24 for the handle member. In the front ends of this bail or handle member 20 are pivotally engaged links or hangers 25 which have their lower ends engaged in bearing brackets 26 supporting an axle 27 which carries the crusher drum 28.

It will be readily understood that by swinging the rear end of the member 20 downwardly the front ends thereof will be raised and, consequently, the axle 27 and the drum carried thereby will be lifted out of contact with the ground and will become inoperative. In order that the drum may operate effectually when it is in its lowered position illustrated in Fig. 2, I provide a draft bail or supplemental frame 29 which spans the drum and has its ends fitted about the axle 27. In the front bridging portion of this bail or supplemental frame 29 are secured bolts 30 which project forwardly through the front bridging member of the frame 10 and play loosely in openings 31 provided therefor in the latter frame. These openings 31 are of such dimensions that the bolts may move laterally or vertically within the area of the openings so that the vertical movement imparted to the crusher drum by the handle member 20 will be accommodated but at the same time the said drum will be so connected with the frame 10 that it will be obliged to travel over the ground with the rest of the machine. To retain the bolts 30 through the openings 31, nuts 32 are fitted upon the forward ends of the bolts and bear against the front extremity of the supplemental frame 10, as will be readily understood and as shown in Fig. 2. The crusher drum comprises spokes 33 radiating from the axle 27 and a rim or tread member carried by the outer ends of the spokes. As shown most clearly in Fig. 1, this rim or tread member is a sheet metal plate bent to circular form so as to encircle and be secured to all the spokes 33 and having openings 34 formed therethrough at regular intervals. When the drum is lowered to the ground, it will, of course, rotate through its tractive engagement with the surface and the openings 34 will, consequently, be presented to the ground and the plants at regular intervals, the intermediate imperforate portions of the drum crushing the plants presented thereto so that the row will be left in equi-distant hills. The drum crushes the cotton at regular intervals, and the crushed cotton and weeds are covered by the cultivators which follow immediately behind the drum. The crushed vegetation is effectually destroyed so that it will not come to the surface, and loose surface soil is thrown onto the hills so that clean rows appear after the machine has passed.

From the foregoing description, taken in connection with the accompanying drawings, it will be seen that I have provided an exceedingly simple device by the use of which the young crop of cotton plants will be very quickly and easily thinned so that plants will be left standing at regluar intervals and may be permitted to mature. When the machine is to be carried from one field to another field, the crusher drum is raised and the cultivators are also raised and will be held in their raised positions by the engagement of the hooks 19 and the clips 21 with the rear ends of the side bars 1 of the main frame. The cultivators may be lowered so as to follow immediately behind the crusher drum and turn the loose surface soil over against the stems of the young plants left standing to protect them and facilitate their growth, or if desired the cultivators may be held in their raised inoperative position while the drum is operated to reduce the number of plants.

Having thus described the invention, I claim:

A machine for the purpose set forth comprising a portable main frame, a lower frame suspended rigidly from the main frame and having openings formed through its front end, a draft bail, a crusher drum carried by the rear end of said bail, connecting devices secured in the front end of the bail and held in and playing loosely through the openings in the front end of the lower frame, and a handle member mounted between its ends upon the main frame and connected with the rear end of the draft bail for raising and lowering the crusher drum.

In testimony whereof I affix my signature.

JAMES P. OLSON. [L. S.]